3,432,286
CONTROL OF AQUATIC PLANTS WITH DITHIODIUNDECANOIC ACID
Dorsey R. Mussell, Clare, Mich., assignor to The Dow Chemical Company, Midland, Mich., a corporation of Delaware
No Drawing. Filed Sept. 12, 1966, Ser. No. 578,455
U.S. Cl. 71—66        6 Claims
Int. Cl. A01n 5/00, 23/00; C09k 3/00

ABSTRACT OF THE DISCLOSURE

A method useful for the control of aquatic plants is disclosed wherein a growth-inhibiting amount of 11,11'-dithiodiundecanoic acid or a salt thereof is introduced into water adjacent the submersed portions of an aquatic plant. Compositions useful in practicing the method are also disclosed.

---

This invention relates to herbicides and is particularly concerned with a composition and method for killing aquatic plants. The expression "aquatic plants" as herein employed refers to vegetative organisms normally growing in water and in which the leaf and stem parts are largely submerged. The expression is inclusive of water plants which are not rooted such as Ceratophyllum spp. (coontail) and Salvinia spp. (floating moss) and rooted aquatic weeds such as Anacharis (Elodea) spp. (water weed), Vallisneria spp. (tape grass), Potamogeton spp. (pond weed) and the like.

Aquatic plants growing out of place are commonly called weeds, and millions of dollars are expended annually for their control. In irrigation ditches, canals, rivers and streams of pleasure and commerce, these plants hinder the flow of water and cause excessive sedimentation. Further, such growth will result in high water loss from evaporation and interfere with navigation. Mechanical operations such as dredging, chaining, burning and mowing are still the principal means of control. More recently, efforts have been made at chemical control. The shortcomings of the latter methods have included superficial burning of exposed leaves without the killing of the roots so as to permit the quick regrowth of the plants. Also, many of the chemicals are specific in their action and control only a few species, thus leading to increased growth activity on the part of unaffected plants.

It is an object of the present invention to provide a new and improved method for the control and suppression of the growth of aquatic plants. Another object is the provision of a method for the treatment of the water adjacent to aquatic plants in a pond or stream to control the growth of the plants. A further object is the provision of a method which will control the growth of a large variety of aquatic plant species. An additional object is the provision of novel compositions to be employed in the new methods for suppressing the growth of aquatic plants. Other objects will become apparent from the following specification and claims.

According to the present invention, it has been found that 11,11'-dithiodiundecanoic acid and the alkali metal, amine and ammonium salts thereof are very toxic to aquatic plants when such compounds or a suitable composition in which they are employed is introduced into water adjacent to the submersed portions of aquatic plants. 11,11'-dithiodiundecanoic acid is a white solid soluble in many organic solvents and in water. The compound is readily and conveniently adapted to be distributed in water to control aquatic weeds. It is among the advantages of the present invention that the compound of the present invention accomplishes a quick kill of the stems and leaves of aquatic plants accompanied by the control in a short period of time of the roots. A particular advantage of the present invention is the wide range of water temperatures over which the compound is effective. Thus, the treatment can be carried out at almost any water temperature which will permit the growth and development of aquatic plants. A still further advantage of the methods and compositions of the present invention is their ability to control a wide variety of aquatic plants.

The distribution in water adjacent to growing aquatic plants of a growth-inhibiting amount of the active compound, that is, dosage of the 11,11'-dithiodiundecanoic acid compound effective to control growth of the plants, is essential for the practice of the present invention. In general, good results are obtained when the compound is distributed in water adjacent to growing aquatic weeds in an amount of from about 2 to 400 parts or more by weight per million parts by weight of the medium. The exact dosage to be employed is dependent upon various factors such as the plant mass to be treated and whether or not the exposure is carried out in a moving stream such as a canal or in standing water such as a pond. In standing water, good results are obtained when employing minimal dosages of the compound. In moving streams, somewhat higher concentrations are required in order to provide the contacting of the plant with a herbicidal amount of the 11,11'-dithiodiundecanoic acid compound.

The method of the present invention may be carried out by distributing a growth-inhibiting amount of 11,11'-dithiodiundecanoic acid compound or a composition containing the compound in water adjacent to the growing plants. In such usage, the compound may be modified with one or more of a plurality of additaments or herbicide adjuvants, including water or inert organic solvents, surface-active dispersing agents or finely divided solids. Preferred compositions of the present invention comprise emulsifiable liquid concentrates and wettable powder concentrates. Such concentrates are readily and conveniently adapted to be distributed in water adjacent to aquatic plants to provide in the water, growth-inhibiting concentrations of the toxicant.

Liquid compositions containing the desired amount of the 11,11'-dithiodiundecanoic acid compound may be prepared by dissolving the toxicant compound in an organic liquid such as alcohols, alkyl ethers of glycols and polyglycols, acetone, toluene, methylene chloride, chlorobenzene and petroleum distillates, or a mixture of one or more such liquids, or by dispersing the toxicant compound in water with the aid of a suitable surface active dispersing agent. The aqueous compositions may contain one or more water-immiscible solvents for the bis-thio acid compound. In such compositions, the carrier comprises an aqueous emulsion, that is, a mixture of toxicant compound, water-immiscible solvent, emulsifying agent and water. The compositions should be characterized by a density only slightly greater than water and should contain sufficient of the dispersing and emulsifying agent to make the composition self-dispersing in water to give a milky dispersion which thereafter breaks to permit settling out of a solution of the bis-thio acid compound.

In the preparation of wettable powder compositions, the bis-thio acid compound is dispersed in and on a finely divided inert solid such as bentonite, fuller's earth, attapulgite and other clays. In utilizing the clay minerals as dispersing agents, it is frequently desirable to employ an excess of such agent over and above the minimum necessary for dispersing the composition, the excess clay mineral then acting as a finely divided diluent and carrier. Such compositions may contain other finely divided solid carriers such as gypsum, talc and diatomaceous earth. In such operations, the solid carrier is mechanically ground or otherwise intimately admixed with the bis-thio acid compound and a surface-active dispersing agent. Such compositions preferably contain a preponderance of particles which pass through a sieve having 100 meshes to the inch. The compositions should contain sufficient of the dispersing and surface-active agent to make the compositions self-dispersing in water and should have a density slightly greater than water. Dust compositions can be similarly prepared with or without the addition of surface-active agents.

The surface-active dispersing agents are generally employed in the amount of from 1 to 20 percent by weight of the combined weight of the agent and 11,11′-dithiodiundecanoic acid compound in the composition. Dispersing and emulsifying agents which may be employed in the compositions include the condensation products of alkylene oxides with phenols and organic acids, alkyl aryl sulfonates, polyoxyalkylene derivatives of sorbitan esters, complex ether alcohols, mahogany soaps and the like.

The exact concentration of the bis-thio acid compound to be employed in compositions for the treatment of aquatic plant-infested loci is not critical and may vary considerably depending on how the composition is to be employed and whether or not it is designed as a concentrate, provided the required dosage of effective agent is supplied in the water adjacent to the plants.

Dust compositions for direct application to the water may contain from as little as 0.25 percent to 50 percent or more by weight of the active ingredient. For use as a concentrate in the preparation of sprays or more dilute dusts, the compositions of the invention may contain from 10 percent to as high as 90 to 95 percent of the bis-thio acid ingredient, the balance of the composition being one of the diluents and carriers and/or wetting and surface-active dispersing agents previously mentioned. Liquid dispersions of the toxicant in water or an organic solvent similarly may vary in concentration from a very low percentage of the active ingredient, e.g., 0.01 to 15.0 percent by weight, or higher, where the dispersion is to be distributed directly in the water adjacent to the aquatic plants, to a relatively high percentage, e.g., 5 to 50 percent by weight, or higher, where the dispersion is to be employed as a concentrate.

Alternatively, where the distribution of dusts might result in inadvertent application or drifting beyond the area to be treated, the active bis-thio acid compound may be incorporated into preformed solid carrier granules or one of the above dust compositions may be granulated by conventional methods. Similarly, a dust composition may be pelleted or tableted to provide an application form which does not drift when applied, for example, from an aeroplane. Dispersing agents may be incorporated to accomplish the rapid breakdown of such granules, pellets or tablets or, if a long-acting treatment is contemplated, water-repellent agents or agents such as gums can be incorporated to delay the release of the active agent into the aqueous medium.

In carrying out the method of the present invention, a growth-inhibiting amount of the 11,11′-dithiodiundecanoic acid compound is dispersed into the water adjacent to the submersed portions of the plants in a pond, lake, river, canal, stream, ditch or other watercourse in any suitable fashion. In one embodiment, the active compound is distributed by introducing the 11,11′-dithiodiundecanoic acid compound or a composition containing the compound into water above a plant mass so as to permit its dispersion in the water adjacent the growing plant. This introduction of the toxicant into the water adjacent aquatic weeds conveniently may be accomplished by spraying or sprinkling the composition onto or beneath the surface of the water or by metering the composition into the vortex of a rapidly-turning propeller to obtain maximum distribution of the compound in the water.

In moving watercourses, water flow may be employed to distribute the 11,11′-dithiodiundecanoic acid compound. Thus, the toxicant may be introduced into the water in such a manner that it is distributed into and over the plant growth area for a sufficient exposure time to kill the plants.

The following examples illustrate the invention but are not to be construed as limiting.

EXAMPLE 1

In a representative operation, 0.4 part by weight of 11,11′-dithiodiundecanoic acid, 0.015 part of an alkyl aryl sulfonate (sold under the name Nacconal NR by Allied Chemical Co.), 0.015 part of a polymerized sodium salt o fa substituted benzoid alkyl sulfonic acid (sold under the name Daxad No. 27 by Dewey and Almy Chemical Division, W. R. Grace & Co.) and 100 parts of water were mixed together in a ball mill for three hours to provide a liquid water-dispersible concentrate. This concentrate was further diluted with water to prepare aqueous compositions containing 10 and 5 parts by weight of toxicant per million parts of water. These compositions were employed for the treatment of *Cabomba caroliniana* (*Cabomba*), *Salvinia rotundifolia* (*Salvinia*), *Lysimastrum nummularia* (*moneywort*), *Myriophyllum* spp. (milfoil) and *Elodeo* spp. (water weed) growing in a series of small tanks. In such operations, the aqueous compositions were poured into the tanks to expose the plants to concentrations of 10 and 5 parts by weight of 11,11′-dithiodiundecanoic acid per million parts of water. Fresh water was added periodically to make up for losses due to evaporation. Other tanks containing the named species were left untreated to serve as checks.

At regular intervals, observations were carried out to ascertain what control of growth had been obtained. Three weeks following the treating operations, the observations showed 100 percent controls of the growth of the named plant species treated with either concentration of the toxicant compound. At the time of observation, the untreated check tanks were found to support luxurious and succulent growth of the named plant species.

EXAMPLE 2

In another representative operation, 0.4 part by weight of 11,11′-dithiodiundecanoic acid, 0.15 part of Nacconal NR, 0.15 part of Daxad No. 27 and 100 parts of water were mixed together in a ball mill for three hours to provide a liquid water-dispersible concentrate. This concentrate was further diluted with water to prepare an aqueous composition containing 2 parts by weight of toxicant per million parts of water. These compositions were employed for the treatment of Cabomba, water weed, Salvinia and milfoil growing in a series of small tanks. In such operations, the aqueous compositions were poured into the tanks to expose the plants to a concentration of 2 parts by weight of 11,11′-dithiodiundecanoic acid per million parts by weight of water. Fresh water was added periodically to make up for losses due to evaporation. Other tanks containing the named species were left untreated to serve as checks. At regular intervals, observations were carried out to ascertain what control of growth had been obtained. Three weeks following the treating operations, the observations showed 95 percent control of milfoil and 100 percent control of the three other named species in the treated tanks. At the time of observation, the untreated check tanks were found to support luxurious and succulent growth of the named plant species.

EXAMPLE 3

Fifty parts by weight of 11,11′-dithiodiundecanoic acid, 45 parts of fuller's earth, 3 parts of Daxad No. 27 and 2 parts of Nacconal NR are mechanically mixed and ground together to prepare a concentrate composition in the form of a wettable powder.

In a similar manner, a mixture of 20 parts by weight of 11,11′-dithiodiundecanoic acid, 0.8 part by weight of Daxad No. 27, 0.8 part by weight of Nacconal NR and 200 parts of water are mixed together in a ball mill to prepare a water-dispersible liquid concentrate composition.

Also, a liquid concentrate composition is prepared by mechanically mixing together 40 parts by weight of 11,11'-dithiodiundecanoic acid, 1 part of sorbitan trioleate (sold under the name Span 85 by Atlas Powder Co.), 0.5 part of a polyoxyethylene sorbitan monolaurate (sold under the name Tween 20 by Atlas Powder Co.) and 60 parts of acetone.

In a similar manner, an emulsifiable concentrate is prepared by mechanically mixing and grinding together 25 parts by weight of 11,11'-dithiodiundecanoic acid, 0.8 part of sorbitan trioleate (Span 85), 0.4 part of polyoxyethylene sorbitan monolaurate (Tween 20) and 60 parts of xylene. These concentrate compositions or aqueous dispersions thereof in a small quantity of water are adapted to be employed to distribute growth-inhibiting amounts of the dithiodiundecanoic acid compound in water adjacent to growing aquatic weeds.

EXAMPLE 4

One molar proportion of 11,11'-dithiodiundecanoic acid is mixed with one molar proportion of sodium bicarbonate in aqueous solution to prepare an aqueous composition containing monosodium 11,11'-dithiodiundecanoate.

One molar proportion of 11,11'-dithiodiundecanoic acid is mixed with two molar proportions of sodium bicarbonate in aqueous solution to prepare an aqueous composition containing disodium 11,11'-dithiodiundecanoate.

One molar proportion of 11,11'-dithiodiundecanoic acid is mixed with two molar proportions of potassium bicarbonate in aqueous solution to prepare an aqueous composition containing dipotassium 11,11'-dithiodiundecanoic acid.

One molar proportion of 11,11'-dithiodiundecanoic acid is mixed with one molar proportion of aqueous ammonium hydroxide to prepare an aqueous composition containing monoammonium 11,11'-dithiodiundecanoate.

One molar proportion of 11,11'-dithiodiundecanoic acid is mixed with one molar proportion of triethylamine in aqueous solution to prepare an aqueous composition containing monotriethylamine 11,11'-dithiodiundecanoate.

The compositions can be concentrated by conventional methods such as evaporation or distillation to remove water therefrom. The aqueous compositions or the concentrated compositions of the alkali metal, ammonium and amine salts of the bis-thio acid compound are adapted to be employed directly to distribute growth-inhibiting amounts of the salts in water adjacent to growing aquatic weeds.

I claim:

1. A method for controlling the growth of aquatic plants which includes the step of introducing into water adjacent to the submersed portions of the plants, a growth-inhibiting amount of 11,11'-dithiodiundecanoic acid, or the alkali metal, triethylamine or ammonium salts thereof.

2. A method for controlling the growth of aquatic plants which includes the step of introducing into water adjacent to the submersed portions of plants from about 2 parts per million to about 400 parts per million by weight of 11,11'-dithiodiundecanoic acid, or the alkali metal, triethylamine or ammonium salts thereof.

3. A method for controlling the growth of aquatic plants which includes the step of introducing into the water adjacent to the submersed portions of the plants a composition comprising 11,11'-dithiodiundecanoic acid or the alkali metal, triethylamine or ammonium salts thereof as an active ingredient in intimate admixture with a herbicide adjuvant, said composition being employed in an amount sufficient to supply from about 2 parts per million to about 400 parts per million by weight of the 11,11'-dithiodiundecanoic acid or said salts thereof in the water.

4. The method of claim 3 wherein the herbicide adjuvant comprises at least a finely divided solid carrier and a surface active dispersing agent.

5. The method of claim 3 wherein the herbicide adjuvant comprises at least a surface-active dispersing agent and water.

6. The method of claim 3 wherein the herbicide adjuvant comprises at least an emulsifying agent, a water-immiscible solvent and water.

References Cited

UNITED STATES PATENTS

| 2,028,091 | 1/1936 | Jaeger | 260—481 |
|---|---|---|---|
| 2,622,975 | 12/1952 | Zimmerman et al. | 71—113 |
| 2,626,862 | 1/1953 | Zimmerman et al. | 71—113 |
| 2,668,103 | 2/1954 | Goodhue | 71—98 |
| 3,101,265 | 8/1963 | Smutny et al. | 71—66 |
| 3,256,084 | 6/1966 | Kühle et al. | 71—66 |

OTHER REFERENCES

Rigby, "11-Sulfoundecanoic Acid" (1956) CA 51, pp. 1832–33 (1957).

LEWIS GOTTS, Primary Examiner.

G. HOLLRAH, Assistant Examiner.

U.S. Cl. X.R.

71—98